United States Patent [19]

Takahashi

[11] Patent Number: 4,611,029

[45] Date of Patent: Sep. 9, 1986

[54] PROCESS FOR CONTINUOUSLY HYDROLYZING ETHYLENE-VINYL ACETATE

[75] Inventor: Masazumi Takahashi, Itami, Japan

[73] Assignee: Nippon Gohsei Kagaku Kogyo Kabushiki Kaisha, Osaka, Japan

[21] Appl. No.: 685,259

[22] Filed: Dec. 24, 1984

[30] Foreign Application Priority Data

Dec. 29, 1983 [JP] Japan .............................. 58-249298

[51] Int. Cl.$^4$ .............................................. C08F 8/00
[52] U.S. Cl. ....................................... 525/61; 525/60; 525/330.3; 525/330.6; 525/366
[58] Field of Search ............. 525/60, 61, 330.3, 330.6, 525/366

[56] References Cited

U.S. PATENT DOCUMENTS 3,560,461  2/1971  Yonezu et al. ........................ 525/60

FOREIGN PATENT DOCUMENTS 72038558  3/1972  Japan .
1120189   7/1968  United Kingdom .

Primary Examiner—Joseph L. Schofer
Assistant Examiner—J. M. Reddick
Attorney, Agent, or Firm—Antonelli, Terry & Wands

[57] ABSTRACT

A process for continuously hydrolyzing ethylene-vinyl acetate copolymer which comprises feeding a methanol solution in which an ethylene-vinyl acetate copolymer having ethylene of 25 to 50 % by mole into the upper portion of a tower reactor and supplying an alkaline catalyst into the middle portion of the tower, and blowing a methanol vapor into the lower portion of the tower to remove a methyl acetate vapor together with a methanol vapor from the top of the tower and taking out the highly hydrolyzed ethylene-vinyl acetate copolymer from the bottom of the tower, and whereby a highly hydrolyzed ethylene-vinyl acetate copolymer is easily obtained in the presence of a small amount of alkaline catalyst.

11 Claims, No Drawings

PROCESS FOR CONTINUOUSLY HYDROLYZING ETHYLENE-VINYL ACETATE

BACKGROUND OF THE INVENTION

The present invention relates to a process for continuously hydrolyzing ethylene-vinyl acetate copolymer, and more particularly to a process for continuously preparing a high hydrolyzed ethylene-vinyl acetate copolymer by hydrolyzing an ethylene-vinyl acetate copolymer in the presence of an alkaline catalyst in a methanol medium.

There hitherto has been proposed a process for continuously preparing a high hydrolyzed ethylene-vinyl acetate copolymer as disclosed in the Japanese Examined Patent Publication (Tokkyo kokoku) No. 14958/1968, in which an ethylene-vinyl acetate copolymer is hydrolyzed by feeding a methanol solution of a copolymer including ethylene and vinyl acetate as main components and an alkaline catalyst into the upper portion of a tower reactor, while blowing a methanol vapor into the tower reactor to carry out an effective reaction in the tower reactor and removing a methyl acetate vapor together with a methanol vapor out of the tower reactor. In accordance with the above-mentioned Patent Publication, there is disclosed that an amount of the alkaline catalyst is decreased into $\frac{1}{3}$ to $\frac{1}{2}$ and a reaction time is decreased into 1/5 to $\frac{1}{3}$ in comparison with a conventional batch wise process. A fairish amount of sodium acetate, however, is included in the resulting hydrolyzed ethylene-vinyl acetate copolymer, and a washing and removing step of a sodium acetate is needed after a hydrolyzing step. There has been proposed a process for hydrolyzing ethylene-vinyl acetate copolymer as described in the Japanese Examined Patent Publication No. 38558/1972, in which an ethylene-vinyl acetate copolymer is hydrolyzed by feeding a methanol solution of copolymer including ethylene and vinyl acetate as main components into an upper portion of tower reactor while blowing a methanol vapor into the tower reactor to carry out an effective reaction in the tower reactor and removing methanol vapor and methyl acetate vapor out of the tower reactor; and, in that case, a catalyst to be added into a reaction system is divided into two or more parts in order to feed them not only into the upper portion of a tower reactor but also into the middle portion of tower reactor. In accordance with this process, the amount of an alkaline catalyst is decreased into 1/5 to 1/20, and further, a washing and removing step after hydrolysis can be reduced in comparison with the process in the above-mentioned Japanese Examined Patent Publication No. 14958/1968.

But it is impossible to omit the step for washing and removing sodium acetate.

The object of the present invention is to provide an improvement of the above-mentioned process in the Japanese Examined Patent Publication No. 38558/1947.

A further object of the invention is to provide a process for preparing high hydrolyzed ethylene-vinyl acetate copolymer by using a little amount of alkaline catalyst.

Another object of the invention is to provide a process for preparing a non-colored highly hydrolyzed ethylene-vinyl acetate copolymer.

SUMMARY OF THE INVENTION

That is to say, the process of the present invention is composed of feeding a methanol solution including an ethylene-vinyl acetate copolymer into the upper portion of a tower reactor and an alkaline catalyst into the middle portion of the tower, and blowing a methanol vapor into the lower portion of the tower to remove a methyl acetate vapor together with a methanol vapor from the top of the tower and taking out the highly hydrolyzed ethylene-vinyl acetate copolymer from the bottom of the tower.

DETAILED DESCRIPTION

In the present invention, the feature is to form a zone which does not contain an alkaline catalyst between the upper portion of a tower reactor into which a methanol solution of ethylene-vinyl acetate copolymer is fed and the middle portion of the tower reactor in which an alkaline catalyst is fed. By this way, it is made possible that a highly hydrolyzed ethylene-vinyl acetate copolymer having residual vinyl acetate unit of not more than 0.5% by mole is produced in the presence of an alkaline catalyst which is decreased into an amount of $\frac{1}{3}$ to 1/20 time in comparison with the process disclosed in the Japanese Examined Patent Publication No. 38558/1972. Moreover, a high hydrolyzed ethylene-vinyl acetate copolymer having a residual vinyl acetate unit of not more than 0.1% by mole is easily obtained.

In the present invention, an ethylene content in ethylene-vinyl acetate copolymer employed for hydrolyzing is selected from the range of 25 to 50% by mole.

When the ethylene content is less than 25% by mole, it is necessary to heat the copolymer up to considerably high temperature under a very high reaction pressure for keeping a methanol solution of ethylene-vinyl acetate copolymer in a uniform state, and the hydrolyzed ethylene-vinyl acetate copolymer will be deteriorated depending upon the residence time.

When the ethylene content is more than 50 % by mole, a large amount of catalyst is necessary to hydrolyze the copolymer. Therefore it is difficult to obtain the feature of the present invention.

An ethylene-vinyl acetate copolymer is fed into a tower reactor as a methanol solution. In that case, a concentration of the ethylene-vinyl acetate copolymer is not particularly limited. But the extremely high concentration is undesirable since a viscosity of the methanol solution becomes high and the operation control of reaction is difficult. The concentration of ethylene-vinyl acetate copolymer in the methanol solution varies depending upon the composition and the degree of polymerization of the copolymer and the reaction temperature. In general, the concentration is selected from the range of 25 to 60% by weight.

Though the temperature of methanol vapor blowing into the tower reactor is usually the boiling point of a methanol under the internal pressure of the tower reactor, methanol vapor superheated more than boiling point can be blown into the tower reactor. In general, the methanol vapor is employed in an amount required for substantialy, completely removing the methyl acetate produced in the hydrolyzing reaction. The amount of methanol vapor is preferably decided by the following formula which is based upon ethylene content in the ethylene-vinyl acetate copolymer, concentration in the methanol solution of the copolymer and the operation condition in the tower reactor.

$$0.8 > \frac{\dfrac{74A_T \cdot R_c(1 - E_c)}{(1 - R_c)[86 + E_c(M - 86)]}}{A_B - \dfrac{27.6A_T \cdot R_c(1 - E_c)}{(1 - R_c)[86 + E_c(M - 86)]}} > 0.35$$

$$\text{and } Z \cdot (P)^{0.15} \cdot (R_c)^{-0.1} > 0.38$$

wherein $A_T$ is an amount of methanol in methanol solution of ethylene-vinyl acetate copolymer fed in a tower reactor [kg/hour], $A_B$ is an amount of a methanol vapor blown in a tower reactor [kg/hour], $R_c$ is a concentration of ethylene-vinyl acetate copolymer in methanol solution fed in a tower reactor [weight fraction], $E_c$ is an ethylene content in an ethylene-vinyl acetate copolymer fed in a tower reactor [mol fraction], M is a molecular weight of ethylene, and P is a pressure [atmosphere] at the upper portion of the tower reactor.

$$Z = \frac{\dfrac{74A_T \cdot R_c(1 - E_c)}{(1 - R_c)[86 + E_c(M - 86)]}}{A_B - \dfrac{27.6A_T \cdot R_c(1 - E_c)}{(1 - R_c)[86 + E_c(M - 86)]}}$$

It is preferable to use a strong base such as caustic soda or caustic potash or an alcoholate of alkali metal such as sodium methylate or potassium ethylate as an alkaline catalyst. An amount of the alkaline catalyst is decided depending on a variety of the catalyst, the ethylene content of the ethylene-vinyl acetate copolymer, the degree of hydrolysis of the desired hydrolyzed ethylene-vinyl acetate copolymer, and so on. The suitable amount of the alkaline catalyst employed is 2 to 10 millimole per 1 mole of the vinyl acetate in the ethylene-vinyl acetate copolymer.

The reactor employed is, for instance, a plate column such as a perforated plate tower or a bubble-cap tower; a general distillation column; a packed tower, and the like. In general, a plate column having large residence time is preferable.

In the present invention, an alkaline catalyst is fed into the middle portion of the tower. The term "middle portion of the tower" as herein used means the portion positioned between about 60th plate and about 40th plate when total number of plates of the tower is regarded as 100. The catalyst-feeding position is located over the above middle portion, and a remarkably increased amount of catalyst is required for obtaining the desired degree of hydrolysis. In the present invention, the alkaline catalyst can be fed into many portions of the middle portion of the tower.

The higher internal pressure of the tower is employed, the more effectively the feature of the present invention is attained. However, the range of 0.5 to 10 atms. is preferable. The temperature in the tower is usually selected from the boiling point in the range of 45° to 150° C. which is decided depending upon the pressure and the composition in the tower.

The methanol vapor is preferably blown between the bottom plate of the tower and the surface of the residence solution in the bottom of the tower.

The highly hydrolyzed ethylene-vinyl acetate copolymer of the present invention scarcely contains sodium acetate, and therefore, it is not required to wash and remove the sodium acetate from the copolymer after hydrolysis. The said hydrolyzed ethylene-vinyl copolymer is not deteriorated with the passage of time and is not colored after heating treatment.

The present invention is more specifically described and explained by means of the following Examples. It is to be understood that the present invention is not limited to the Examples, and various changes and modifications may be made in the invention without departing from the spirit and scope thereof.

EXAMPLE 1

A methanol solution in which a concentration of an ethylene-vinyl acetate copolymer (ethylene content: 39 by mole) was 55% by weight was fed into the upper portion of a 100 mm$\phi$ tower provided with 55 porous plates at the rate of 10.3 kg per hour, and a methanol solution including 3.5% by weight of caustic soda was fed onto the 30th plate from the top of the tower at the rate of 189 g per hour. While, a methanol vapor of 86° C. was fed into the tower from the under portion of the tower at the rate of 9.7 kg per hour to obtain a methanol solution including a 42.2% by weight of the hydrolyzed copolymer having a degree of hydrolysis of 99.5% by mole and a 0.17% by weight of sodium acetate from the bottom of the tower at the rate of 8.05 kg per hour. A distillate was obtained from the top of the tower at the rate of 12.2 kg per hour by inducing a mixed vapors including methanol and methyl acetate as main components into a condenser. The distillate contained a methyl acetate content of 33.0% by weight.

Besides, the inner temperature of the tower was 76° C. at the top of the tower or 86° C. at the bottom of the tower, and the pressure was 2 atms. at the top of the tower.

COMPARATIVE EXAMPLE 1

The procedures of Example 1 were repeated except that a methanol solution including a 3.5% by weight of caustic soda was fed into the two portions of the tower, that is to say, the two portions were the upper portion of the tower and the 15th plate from the top of the tower. The rate of the feeding were 189 g per hour at the upper portion of the tower and 1.7 kg per hour at the 15th plate from the top of the tower. Therefore, a methanol solution including a 34.8% by weight of the hydrolyzed copolymer having a degree of hydrolysis of 99.5% by mole and 1.38% by weight of sodium acetate at the rate of 9.8 kg per hour was obtained from the bottom of the tower, and a distillate having a methyl acetate content of 32.2% by weight was obtained by inducing a mixed vapors including methanol and methyl acetate as main component into a condenser.

EXAMPLE 2

A methanol solution in which a concentration of an ethylene-vinyl acetate copolymer (ethylene content: 29% by mole) was 53.5% by weight was fed into the upper portion of the tower at the rate of 11.1 kg per hour, and a methanol solution including 3.5% by weight of caustic soda was fed onto the 25th plate from the top of the tower at the rate of 178 g per hour. The tower reactor was the same one as in the Example 1. Therefore, methanol vapor of 124° C. was blown into the under portion of the tower at the rate of 8.9 kg per hour to obtain a methanol solution including 40.0% by weight of the hydrolyzed copolymer having a degree of hydrolysis of 95.6% by mole and 0.15% by weight of sodium acetate from the bottom of the tower at the rate of 8.50 kg per hour. A distillate including a methyl acetate content of 38.2% by weight was obtained from the top of the tower at the rate of 11.7 kg per hour.

Besides, the inner temperature of the tower was 114° C. at the top of the tower and 125° C. at the bottom of the tower and the pressure was 2 atms. at the top of the tower.

EXAMPLE 3

A methanol solution in which a concentration of an ethylene-vinyl acetate copolymer (ethylene content: 48% by mole) was 50% by weight was fed into the upper portion of the tower at the rate of 10.0 kg per hour and a methanol solution including a 3.5% by weight of caustic soda was fed onto the 30th plate from the top of the tower at the rate of 417 g per hour. The tower reactor was the same as that in the Example 1.

Therefore, 68° C. of a methanol vapor was blown into the under portion of the tower at the rate of 11.0 kg per hour to obtain a methanol solution including 37.5% by weight of the hydrolyzed copolymer having a degree of hydrolysis of 99.5% by mole and 0.35% by weight of sodium acetate from the bottom of the tower at the rate of 8.35 kg per hour and a distillate including a methyl-acetate content of 25.0% by weight from the top of the tower at the rate of 13.0 kg per hour.

Besides, the inner temperature of the tower was 57° C. at the top of the tower and 68° C. at the bottom of the tower and the pressure was 1 atm. at the top of the tower.

COMPARATIVE EXAMPLES 2 AND 3

The procedures of Example 1 were repeated except that the portion feeding a methanol solution including 3.5% by weight of caustic soda into the tower was changed into the 20th plate or the 40th plate from the top of the tower. A degree of hydrolysis of the hydrolyzed ethylene-vinyl acetate copolymer obtained from the bottom of the tower was 97.5% or 98.0% by mole.

What we claim is:

1. A process for continuously hydrolyzing an ethylene-vinyl acetate copolymer in the presence of an alkaline catalyst which comprises feeding a methanol solution consisting essentially of methanol and an ethylene-vinyl acetate copolymer having an ethylene content of 25 to 50% by mole into an upper portion of a tower reactor, supplying all of the alkaline catalyst into a middle portion of the tower in an amount of from 2 to 10 millimoles per 1 mole of vinyl acetate in the ethylene-vinyl acetate copolymer, blowing a methanol vapor into a lower portion of the tower, removing a methyl acetate vapor together with a methanol vapor from the top of the tower and taking out a highly hydrolyzed ethylene-vinyl acetate copolymer having a residual vinyl acetate unit of not more than 0.5% by mole from the bottom of the tower.

2. The process of claim 1, wherein the concentration of said copolymer in the methanol solution is from 25 to 60% by weight.

3. The process of claim 1, wherein said methanol vapor has a temperature equal to a boiling point of methanol under the internal pressure of the tower reactor.

4. The process of claim 1, wherein said alkaline catalyst is a strong base or an alcoholate of alkali metal.

5. The process of claim 4, wherein said strong base is caustic soda or caustic potash.

6. The process of claim 4, wherein said alcoholate of alkali metal is sodium methylate or potassium ethylate.

7. The process of claim 1, wherein said tower reactor is a plate column.

8. The process of claim 7, wherein said plate column is a perforated plate tower or a bubble-cap tower.

9. The process of claim 1, wherein the pressure within the tower is from 0.5 to 10 atms.

10. The process of claim 1, wherein the temperature in the tower is from 45° to 150° C.

11. The process of claim 2, wherein the methanol vapor is blown in an amount required for completely removing the methyl acetate produced during the hydrolyzing reaction, the pressure within the tower is from 0.5 to 10 atms. and the temperature in the tower is from 45° to 150° C.

* * * * *

UNITED STATES PATENT AND TRADEMARK OFFICE
CERTIFICATE OF CORRECTION

PATENT NO. : 4,611,029

DATED : September 9, 1986

INVENTOR(S) : M. TAKAHASHI

It is certified that error appears in the above-identified patent and that said Letters Patent is hereby corrected as shown below:

On the Title Page, left hand column:

[54] "PROCESS FOR CONTINUOUSLY HYDROLYZING ETHYLENE-VINYL ACETATE" should read

-- PROCESS FOR CONTINUOUSLY HYDROLYZING ETHYLENE-VINYL ACETATE COPOLYMER--

Signed and Sealed this

Sixth Day of January, 1987

Attest:

DONALD J. QUIGG

Attesting Officer

Commissioner of Patents and Trademarks